United States Patent [19]

Amano et al.

[11] 4,127,679

[45] Nov. 28, 1978

[54] METHOD OF MAKING ICE CREAM

[75] Inventors: Haruyuki Amano, Yachiyo; Akira Nakano, Funabashi, both of Japan

[73] Assignee: Kao Soap Co., Ltd., Tokyo, Japan

[21] Appl. No.: 825,199

[22] Filed: Aug. 17, 1977

[30] Foreign Application Priority Data

Sep. 3, 1976 [JP] Japan ................................ 51-105527

[51] Int. Cl.² .......................... A23G 9/04; A23G 9/00
[52] U.S. Cl. .................................... 426/565; 426/566; 426/654
[58] Field of Search ....................... 426/565, 566, 654

[56] References Cited

U.S. PATENT DOCUMENTS

| | | | |
|---|---|---|---|
| 3,017,276 | 1/1962 | Knightly | 426/566 |
| 3,515,562 | 6/1970 | Landfried et al. | 426/566 |
| 3,845,223 | 10/1974 | Moneymaker et al. | 426/566 |

*Primary Examiner*—Jeanette M. Hunter
*Attorney, Agent, or Firm*—Blanchard, Flynn, Thiel, Boutell & Tanis

[57] ABSTRACT

Frozen desserts are prepared using, as an emulsifier, esters of elaidic acid with polyhydric alcohols selected from the group consisting of glycerol, propylene glycol, sorbitol and saccharose.

9 Claims, No Drawings

METHOD OF MAKING ICE CREAM

BACKGROUND OF THE INVENTION

1. Field of the Invention

This invention relates to frozen desserts prepared by using, as an emulsifier, elaidic acid esters of polyhydric alcohols selected from the group consisting of glycerol, propylene glycol, sorbitol and saccharose.

2. Description of the Prior Art

Various frozen desserts such as ice cream, ice cream of low fat content, ice milk, fruit sherbets, frozen custards and mellorine have been prepared by freezing homogenized oil-in-water emulsions each of which contains oil and fat, skim milk, saccharose, flavorings, water and an emulsifier. Monoglycerides of fatty acids have conventionally been used, as emulsifiers, in the preparation of various frozen desserts and have exerted very important effects on the production processes.

When used as emulsifiers, the monoglycerides of fatty acids mainly function to improve foamability, to impart solidity and to improve the shape-retaining property of the frozen dessert. Illustrative monoglycerides of fatty acids conventionally used for these purposes include the monoglyceride of stearic acid, the monoglyceride of oleic acid and mixtures thereof.

The reasons for the fact that the monoglyceride of stearic acid (glyceryl monostearate) and the monoglyceride of oleic acid (glyceryl monooleate) have been generally used for this purpose are that not only are the starting fatty acids for these glycerides available most easily, but also these glycerides have special advantages for such use. In brief, the monoglyceride of stearic acid has a strong emulsifying force and does not deteriorate the flavor and taste, and on the other hand, the monoglyceride of oleic acid can considerably improve the shape-retaining property.

However, these glycerides have serious disadvantages, and thus they cannot be considered as the ultimate or best emulsifiers. Specifically, the monoglyceride of stearic acid has a very poor shape-retaining property, and the monoglyceride of oleic acid causes serious deterioration of the flavor and taste and it has the further disadvantage that it increases greatly the viscosity of the starting mixture for preparing the frozen dessert which is disadvantageous when the starting mixture is aged or digested.

For this reason, stearic monoglyceride and oleic monoglyceride are mixed together for practical use. Even when the mixed composition is used, the deterioration of flavor and taste due to the oleic monoglyceride is not completely obviated. Accordingly, it is desired to decrease the amount of oleic monoglyceride used in the mixture from the standpoint of flavor and taste, but to increase it for improving other desired qualities or properties such as the shape-retaining property. In consideration of the contradictory requirements mentioned above, the practical mixing ratio of oleic monoglyceride to stearic monoglyceride is in the range of 20 to 30 percent, based on the total weight of the mixture of the two monoglycerides.

The amount of the emulsifier in a starting mixture for preparing ice cream in the most generally practiced process for making ice cream is from 0.20 to 0.35% by weight, based on the total weight of the ice cream mix, so that the amount of oleic monoglyceride, based on the weight of the starting ice cream mix, is 0.04 to 0.12% by weight.

Oleic monoglyceride affects seriously the flavor and the taste of the ice cream, even though the used amount thereof is so small.

SUMMARY OF THE INVENTION

We have discovered an emulsifier for ice cream which does not cause any flavor or taste problems and which has sufficient foamability and improved shape-retaining property. According to the invention, there is used, as an emulsifier for frozen dessert mixes, an elaidic acid ester of a polyhydric alcohol selected from the group consisting of elaidic monoglyceride, elaidic ester of propylene glycol, elaidic ester of sorbitol, elaidic ester of saccharose and mixtures thereof. Elaidic monoglyceride (glyceryl monoelaidate) is particularly preferred for the purposes of this invention.

The elaidic ester of polyhydric alcohol which is used in the present invention can be easily prepared from elaidic acid and a polyhydric alcohol selected from the group consisting of glycerin, propylene glycol, sorbitol and saccharose by a synthesis method in which a portion of the hydroxyl groups in said polyhydric alcohol is esterified with the carboxyl group of said elaidic acid. It is preferred to use emulsifiers which are monoelaidic acid esters of the polyhydric alcohols.

Elaidic acid per se is a well-known fatty acid. However, there have not been synthesized glyceride and other esters of polyhydric alcohols using this particular fatty acid. Moreover, these esters have not yet been used as emulsifiers. Accordingly, it is believed that elaidic esters of polyhydric alcohols are novel emulsifiers. Particularly, elaidic monoglyceride has improved foamability, shape-retaining property, flavor and taste and appropriate viscosity as compared to the conventionally used monoglycerides of stearic acid and oleic acid when any one of the latter-mentioned monoglycerides is used by itself.

The emulsifier of the present invention is superior to the mixture of stearic monoglyceride and oleic monoglyceride heretofore used as an emulsifier.

Elaidic acid is a fatty acid having 18 carbon atoms, the same as stearic acid and oleic acid, and it has one unsaturated bond, the same as oleic acid. However, the double bond of oleic acid is in cis form, whereas the double bond elaidic acid is in trans form. The differences in the physical properties of those acids are attributed to the aforementioned differences in the chemical structures thereof. The most characteristic difference is the difference of the melting points of the respective fatty acids. The melting points of the respective fatty acids are 69.6° C. (stearic acid), 10.9° to 11.5° C. (oleic acid) and 44.8° to 45.5° C. (elaidic acid). Monoglycerides of the respective fatty acids have the melting points of 81° C. (monoglyceride of stearic acid), 35° C. (monoglyceride of oleic acid) and 58.5° to 59.3° C. (monoglyceride of elaidic acid), respectively.

Elaidic acid can be first prepared by converting oleic acid by treatment with the oxides of nitrogen or certain other catalysts, including sulfur and selenium, especially nitrous acid gas or a nitrite and nitric acid. In this reaction, an equilibrium mixture is obtained containing about two-thirds elaidic acid and one-third oleic acid. Elaidic acid can be then isolated by re-crystallization from its alcohol or ether solution, or ether or benzene treatment of its lead salt to remove oleic acid.

Thus obtained elaidic acid is then heated to 200°–250° C. with 1.0–1.5 equivalents of a polyhydric alcohol plus 0.1–2.0% of a catalyst such as lead salt or an alkaline compound such as sodium hydroxide. Water is removed continuously under a reduced pressure of 40–300 mm. The resulting product is a mixture of partial esters of the polyhydric alcohol. In this esterification, it is recommended that the reaction mixture is blanketed with an inert gas such as nitrogen or hydrogen gas to protect from oxidation. The reaction is completed for 1 to 4 hours. At the end of this time an equilibrium will have become established between the free alcohol in the mixture and the reaction product, making it impossible for further combination of the alcohol to take place.

Thereafter, by the use of molecular distillation, technical grades containing 40 to 50% monoesters will give distillates of 90 to 97% monoesters. Three-stage, centrifugal, short-path distillation produces practically instantaneous removal of monoesters with limited decomposition.

As will be understood from the foregoing description, the melting point of elaidic monoglyceride lies at an intermediate temperature between those of stearic monoglyceride and oleic monoglyceride. Elaidic monoglyceride is a novel emulsifier and is a high melting point ester of an unsaturated fatty acid. The melting point (58.5° to 59.3° C.) of elaidic monoglyceride is one of the important characteristics thereof.

The melting point of elaidic monoglyceride is not as high as that (81° C.) of stearic monoglyceride, so that the elaidic monoglyceride is easy to handle during the ice cream preparation steps on one hand; and on the other hand, it is higher than that (35° C.) of oleic monoglyceride and also higher than human body temperature, so that the elaidic monoglyceride does not melt in the mouth cavity and hence does not considerably affect the taste of the ice cream.

The emulsifier of the present invention is mixed with the starting mixture for preparing ice cream prior to the freezing of said starting mixture. The added amount of the emulsifier is, in general, in the range of 0.1 to 0.5% by weight, preferably 0.20 to 0.35% by weight, based on the weight of the starting ice cream mix.

The other ingredients of the starting frozen dessert mixture can be any of those approved by governmental authorities, such as the Food and Drug Administration in the United States of America, for preparing ice cream, mellorine, frozen custard, french ice cream, french custard ice cream, ice milk, fruit sherbets, etc. These other ingredients are well-known and the present invention does not pertain to any discovery concerning them. As is well known, such other ingredients comprise dairy ingredients, sweeteners, flavorings, caseinates, eggs or egg derivatives, stabilizers such as industrial gums, etc.

EXAMPLE 1

Composition

| Material | Parts (g) | Ratio (% by weight) |
|---|---|---|
| Fat (Milk Fat) | 160 | 8.0 |
| Sugar | 300 | 15.0 |
| Skim Milk | 200 | 10.0 |
| Stabilizer | 5 | 0.25 |
| Emulsifier | 5 | 0.25 |
| Water | 1330 | 66.5 |
| Total | 2000 | 100.0 |

Elaidic monoglyceride according to the present invention was used as the emulsifier. For comparative examples, the same compositions were prepared except that in place of the elaidic monoglyceride, there were admixed, respectively, stearic monoglyceride, oleic monoglyceride, and a mixture of stearic monoglyceride and oleic monoglyceride. The thusly prepared compositions were processed in accordance with the conventional method to produce ice cream, and then the properties of the products were compared. The properties compared were viscosity and temperature of the starting ice cream mixture prior to being frozen, overrun, taste and shape-retaining property. The shape-retaining property was tested by a method wherein the solidified ice cream was placed on a net in a chamber maintained at 30° C. The duration of the time period starting immediately after the ice cream had been put into the chamber and terminating at the time when it began to drop through the net was measured. The measured time period is referred to as the dropping initiation time.

The "dropped amount" was also determined by measuring the amounts of the ice cream that dropped through the net during each five minute time interval during the time period from 20 minutes and 45 minutes after the ice cream was put into the chamber.

The test results are set forth in Table 1. Reference numerals (1) to (4) in Table 1 mean that the following emulsifiers Nos. (1) to (4) were used, respectively.

(1) Elaidic Monoglyceride
(2) Stearic Monoglyceride
(3) Oleic Monoglyceride
(4) Mixture of Stearic Monoglyceride and Oleic Monoglyceride (Mixing Ratio = 8:2)

The whipping properties of the ice cream formulations was determined by measuring overrun by weight. Overrun is the amount of ice cream obtained in excess of the amount of mix used and is caused by whipping air into the mix. Percent overrun by weight is determined by the following formula:

$$\text{overrun \%} = 100 \times \frac{(\text{weight of unit volume of mixture}) - (\text{weight of unit volume of ice cream})}{(\text{weight of unit volume of ice cream})}$$

Table I

| Test Item | Emulsifier No. | Embodiment of the Invention (1) | Comparative Samples (2) | (3) | (4) |
|---|---|---|---|---|---|
| Temp. of Starting Mix. (° C) | | 4.5 | 4.0 | 7.0 | 7.0 |
| Viscosity of Starting Mix. (cps) | | 500 | 400 | 5500 | 350 |
| Max. Overrun Value | | 109.5 | 98.0 | 117.0 | 100.5 |
| Dropping Initiation Time | | 32 min. 34 sec. | 11 min. 38 sec. | 38 min. 15 sec. | 18 min. 59 sec. |
| Dropped Amount (%) (Elapsed Time) | 20 min. | 0 | 15.0 | 0 | 0 |
| | 25 min. | 0 | 30.0 | 0 | 14.5 |
| | 30 min. | 0 | 44.0 | 0 | 28.5 |
| | 35 min. | 4 | 58.0 | 0 | 42.5 |
| | 40 min. | 14.5 | 70.0 | 5.0 | 57.0 |
| | 45 min. | 25.5 | — | 11.0 | — |
| Flavor and Taste | | good | good | unpleasant | somewhat unpleasant |

EXAMPLE 2

Composition

| Material | Parts (g) | Ratio (% by weight) |
|---|---|---|
| Fat (Vegetable Oil) | 200 | 10.0 |

-continued

| Material | Parts (g) | Ratio (% by weight) |
|---|---|---|
| Sugar | 290 | 14.5 |
| Skim Milk | 260 | 13.0 |
| Stabilizer | 5 | 0.25 |
| Emulsifier | 5 | 0.25 |
| Water | 1240 | 62.0 |
| Total | 2000 | 100.0 |

As the emulsifiers, elaidic monoglyceride according to the present invention and, for the comparative examples, stearic monoglyceride, oleic monoglyceride, and a mixture of stearic monoglyceride and oleic monoglyceride were used. In accordance with the conventional method, lacto ice cream of high fat content were produced from the above-defined compositions, and the properties of the products were compared.

The test items and methods for measuring the same are the same as in Example 1.

Used Emulsifiers (1) Mixture of Elaidic Monoglyceride and Monoelaidic Ester of Sorbitol (Mixing Ratio = 9:1)
(2) Stearic Monoglyceride
(3) Oleic Monoglyceride
(4) Mixture of Stearic Monoglyceride and Oleic Monoglyceride (Mixing Ratio = 8:2)

The test results are shown in Table 2.

Table 2

| Test Item | Emulsifier No. | Embodiment of the Invention (1) | Comparative Samples (2) | (3) | (4) |
|---|---|---|---|---|---|
| Temp. of Starting Mix. (° C) | | 7.0 | 7.5 | 7.0 | 5.5 |
| Viscosity of Starting Mix. (cps) | | 875 | 875 | 2920 | 950 |
| Max. Overrun Value | | 111.0 | 91.0 | 86.0 | 95.0 |
| Dropping Initiation Time | | 43 min. 28 sec. | 19 min. 16 sec. | above 45 min. | 39 min. 42 sec. |
| Dropped Amount (%) (Elapsed Time) | 20 min. | 0 | 1.0 | 0 | 0 |
| | 25 min. | 0 | 11.0 | 0 | 0 |
| | 30 min. | 0 | 22.0 | 0 | 0 |
| | 35 min. | 0 | 45.0 | 0 | 0 |
| | 40 min. | 0 | 51.0 | 0 | 0 |
| | 45 min. | below 1 | — | 0 | 7 |
| Flavor and Taste | | good | good | unpleasant | somewhat unpleasant |

EXAMPLE 3

Composition

| Material | Parts (g) | Ratio (% by weight) |
|---|---|---|
| Fat (Vegetable Oil) | 60 | 3.0 |
| Sugar | 250 | 12.5 |
| Skim Milk | 120 | 6.0 |
| Stabilizer | 6.5 | 0.325 |
| Emulsifier | 5.0 | 0.25 |
| Water | 1588.5 | 77.925 |
| Total | 2000.0 | 100.0 |

As the emulsifiers, elaidic monoglyceride according to the present invention and, for comparative examples, stearic monoglyceride, oleic monoglyceride, and a mixture of stearic monoglyceride and oleic monoglyceride were used. In accordance with the conventional method, lacto ice creams of low fat content were produced from the above-defined compositions, and the properties of the products were compared.

The test items and methods for measuring the same are the same as in Example 1.

Used Emulsifiers (1) Mixture of Elaidic Monoglyceride and Elaidic Ester of saccharose (Mixing Ratio = 95:5)
(2) Stearic Monoglyceride
(3) Oleic Monoglyceride
(4) Mixture of Stearic Monoglyceride and Oleic Monoglyceride (Mixing Ratio = 70:30)

The test results are shown in Table 3.

Table 3

| Test Item | Emulsifier No. | Embodiment of the Invention (1) | Comparative Samples (2) | (3) | (4) |
|---|---|---|---|---|---|
| Temp. of Starting Mix. (° C) | | 8.0 | 7.0 | 7.0 | 5.5 |
| Viscosity of Starting Mix. (cps) | | 875 | 600 | 6400 | 690 |
| Max. Overrun Value | | 121.0 | 101.0 | 100.0 | 115.0 |
| Dropping Initiation Time | | 27 min. 49 sec. | 12 min. 12 sec. | 43 min. 23 sec. | 21 min. 1 sec. |
| Dropped Amount (%) (Elapsed Time) | 20 min. | 0 | 16.0 | 0 | 0 |
| | 25 min. | 0 | 27.0 | 0 | 2.0 |
| | 30 min. | 3.0 | — | 0 | 17.0 |
| | 35 min. | 10.0 | 52.0 | 0 | 26.0 |
| | 40 min. | 15.0 | 62.0 | 0 | 37.5 |
| | 45 min. | 21.0 | — | below 1 | 46.5 |
| Flavor and Taste | | good | good | unpleasant | somewhat unpleasant |

EXAMPLE 4

Composition

| Material | Parts (g) | Ratio (% by weight) |
|---|---|---|
| Fat (Milk Fat) | 100 | 5.0 |
| (Vegetable Fat) | 60 | 3.0 |
| Sugar | 300 | 15.0 |
| Skim Milk | 200 | 10.0 |
| Stabilizer | 5 | 0.25 |
| Emulsifier | 5 | 0.25 |
| Water | 1330 | 66.5 |
| Total | 2000 | 100.0 |

As the emulsifiers, elaidic monoglyceride according to the present invention and, for comparative examples, stearic monoglyceride, oleic monoglyceride, and a mixture of stearic monoglyceride and oleic monoglyceride were used. In accordance with the conventional method, soft ice creams were produced from the above-defined compositions, and the properties of the products were compared.

The test for shape-retaining property is omitted, but the other test items and methods for measuring the same are the same as in Example 1.

Used Emulsifiers (1) Mixture of Elaidic Monoglyceride and Elaidic Ester of Propylene Glycol (Mixing Ratio = 85:15)
(2) Stearic Monoglyceride
(3) Oleic Monoglyceride
(4) Mixture of Stearic Monoglyceride and Oleic Monoglyceride (Mixing Ratio = 85:15)

Test results are shown in Table 4.

Table 4

| Test Item / Emulsion No. | Embodiment of the Invention (1) | Comparative Samples (2) | Comparative Samples (3) | Comparative Samples (4) |
| --- | --- | --- | --- | --- |
| Temp. of Starting Mix. (°C) | 6.0 | 5.5 | 6.0 | 7.0 |
| Viscosity of Starting Mix. (cps) | 450 | 475 | 6000 | 375 |
| Max. Overrun Value | 110.0 | 96.0 | 116.0 | 102.0 |
| Flavor and Taste | good | good | unpleasant | somewhat unpleasant |

As will be apparent by comparing Examples 1 to 4, elaidic esters have improved properties in that they have stable foamabilities which are not badly affected by changes in the fats or oils used and changes in the amounts of the used fats or oils, and that they have superior shape-retaining properties in comparison with that exhibited by the mixtures of stearic monoglyceride and oleic monoglyceride.

The embodiments of the invention in which an exclusive property or privilege is claimed are defined as follows:

1. In a method of making oil-in-water emulsion type frozen dessert, including the steps of preparing a starting mixture of the ingredients of the frozen dessert and homogenizing and freezing the starting mixture, the improvement which comprises:
   incorporating in the starting mixture, prior to homogenizing and freezing, an emulsifier selected from the group consisting of glyceryl monoelaidate, eladic acid ester of propylene glycol, elaidic acid ester of sorbitol, elaidic acid ester of saccharose and mixtures thereof, the amount of said emulsifier being effective to form an oil-in-water emulsion of said starting mixture.

2. A method of making frozen desserts as set forth in claim 1, wherein said emulsifier is glyceryl monoelaidate and it is added said starting mixture in an amount of from 0.1 to 0.5% by weight, based on the weight of said starting mixture.

3. A method of making frozen desserts as set forth in claim 1, wherein said emulsifier is elaidic acid ester of propylene glycol, elaidic acid ester of sorbitol or elaidic acid ester of saccharose and it is added to the starting mixture in an amount of from 0.1 to 0.5% by weight, based on the weight of said starting mixture.

4. A frozen dessert containing, as an emulsifier, from 0.1 to 0.5 percent by weight of a substance selected from the group consisting of glyceryl monoelaidate, elaidic acid ester of propylene glycol, elaidic acid ester of sorbitol, elaidic acid ester of saccharose and mixtures thereof.

5. A frozen dessert according to claim 4, in which said emulsifier consists essentially of glyceryl monoelaidate.

6. A frozen dessert according to claim 5, in which said emulsifier consists essentially of a major amount of glyceryl monoelaidate and a minor amount of monoelaidic acid ester of sorbitol.

7. A frozen dessert according to claim 5, in which said emulsifier consists essentially of a major amount of glyceryl monoelaidate and a minor amount of monoelaidic ester of propylene glycol.

8. A frozen dessert according to claim 5, in which said emulsifier consists essentially of a major amount of glyceryl monoelaidate and a minor amount of monoelaidic acid ester of saccharose.

9. A frozen dessert according to claim 5, in which said emulsifier consists of from 85 to 100 weight percent of glyceryl monoelaidate and from zero to 15 weight percent of monoelaidic acid ester of sorbitol, propylene glycol or saccharose, or mixtures of said monoelaidic acid esters.

* * * * *

UNITED STATES PATENT AND TRADEMARK OFFICE
CERTIFICATE OF CORRECTION

PATENT NO. : 4 127 679
DATED : November 28, 1978
INVENTOR(S) : Haruyuki Amano et al It is certified that error appears in the above-identified patent and that said Letters Patent are hereby corrected as shown below:

Column 8, line 3; after "added" insert ---to---.

Column 8, line 21; change "Claim 5" to ---Claim 4---.

Column 8, line 25; change "Claim 5" to ---Claim 4---.

Column 8, line 29; change "Claim 5" to ---Claim 4---.

Column 8, line 33; change "Claim 5" to ---Claim 4---.

Signed and Sealed this

Twenty-sixth Day of February 1980

[SEAL]

Attest:

SIDNEY A. DIAMOND

Attesting Officer   Commissioner of Patents and Trademarks